(12) United States Patent
Hoeschen et al.

(10) Patent No.: US 8,630,466 B2
(45) Date of Patent: Jan. 14, 2014

(54) METHOD OF PROCESSING A RADON DATA BASED IMAGE FUNCTION AND IMAGING METHOD

(75) Inventors: Christoph Hoeschen, Hebertshausen (DE); Oleg Tischenko, München (DE); Yuan Xu, Eugene, OR (US)

(73) Assignees: State of Oregon Acting by and through the State Board of Higher Education on Behalf of the University of Oregon, Eugene, OR (US); Helmholtz Zentrum Munchen Deutsches Forschungszentrum fur Gesundheit und Umwelt (GmbH), Neuherberg (DE)

( * ) Notice: Subject to any disclaimer, the term of this patent is extended or adjusted under 35 U.S.C. 154(b) by 961 days.

(21) Appl. No.: 12/527,188

(22) PCT Filed: Feb. 8, 2008

(86) PCT No.: PCT/EP2008/000983
§ 371 (c)(1),
(2), (4) Date: Dec. 22, 2009

(87) PCT Pub. No.: WO2008/098711
PCT Pub. Date: Aug. 21, 2008

(65) Prior Publication Data
US 2010/0092050 A1    Apr. 15, 2010

Related U.S. Application Data

(60) Provisional application No. 60/901,395, filed on Feb. 14, 2007.

(30) Foreign Application Priority Data

Feb. 14, 2007   (EP) ..................................... 07003163

(51) Int. Cl.
*G06K 9/00*    (2006.01)
(52) U.S. Cl.
USPC ........................................................ 382/128
(58) Field of Classification Search
USPC ........................................................ 382/128
See application file for complete search history.

(56) References Cited

U.S. PATENT DOCUMENTS

| 5,861,627 A * | 1/1999 | Basko et al. ............. 250/363.04 |
| 7,496,181 B2 * | 2/2009 | Mazin et al. .................. 378/149 |
| 2007/0133749 A1 * | 6/2007 | Mazin et al. .................. 378/147 |

FOREIGN PATENT DOCUMENTS

| EP | 1677253 A | 7/2006 |
| WO | WO2008/098711 A1 | 8/2008 |

OTHER PUBLICATIONS

Buzug, "Computed Tomography, From Photon Statistics to Modern Cone-Beam CT," Springer 10(0406):219-221 (2008).

(Continued)

*Primary Examiner* — Valerie Lubin
*Assistant Examiner* — Reginald R Reyes
(74) *Attorney, Agent, or Firm* — Klarquist Sparkman, LLP

(57) ABSTRACT

An image processing method for providing a digitized image as an approximation of an image function $f$, wherein the digitized image comprises a plurality of pixels with a predetermined pixel size, comprises the steps of providing the image function $f$ from Radon data comprising a plurality of projection functions measured corresponding to a plurality of predetermined projection directions (v), and determining pixel values from the image function, the pixel values representing the digitized image to be obtained, wherein the pixel values are determined in dependence on at least two image function values within the pixel size of the respective pixel. Furthermore, an imaging method and an imaging device using the image processing method are described.

20 Claims, 3 Drawing Sheets

(56) References Cited

OTHER PUBLICATIONS

International Search Report and Written Opinion from related application PCT/EP2008/000983, Apr. 10, 2008.

International Preliminary Report on Patentability from related application PCT/EP2008/000983, Aug. 19, 2009.

Lewitt et al., "Alternatives to Voxels for Image Representation in Iterative Reconstruction Algorithms," Physics in Medicine and Biology, 37(3):705-716, Mar. 1, 1992.

* cited by examiner

METHOD OF PROCESSING A RADON DATA BASED IMAGE FUNCTION AND IMAGING METHOD

CROSS REFERENCE TO RELATED APPLICATIONS

This is the U.S. National Stage of International Application No. PCT/EP/2008/000983, filed Feb. 8, 2008, which was published in English under PCT Article 21(2), which in turn claims the benefit of EPC Patent Application No. 07003163.8, filed Feb. 14, 2007, and U.S. Provisional Application No. 60/901,395, filed Feb. 14, 2007, all of which are incorporated herein by reference.

TECHNICAL FIELD

The present invention relates to a method of processing an image function based on Radon data, which comprise a plurality of projection functions measured corresponding to a plurality of predetermined projection directions. Furthermore, the present invention relates to a method and a device for imaging a region of investigation, wherein the above image function processing method is applied.

TECHNICAL BACKGROUND

The non-destructive investigation of samples is an important object in various technical fields like material sciences, medical examinations, archaeology, construction technique, techniques concerning security matters etc. One approach for obtaining an image of a sample e.g. by computer tomography (CT) is based on an irradiation trough a sample plane from different projection directions with X-rays, followed by the reconstruction of the sample plane on the basis of attenuation data measured at different directions. The entirety of the measured attenuation data can be described in terms of so-called Radon data in a Radon space.

Different reconstruction methods for Radon data are known today, which in particular comprise iterative reconstruction methods and filtered back-projection methods. A further improved method of reconstructing image functions from Radon data is described in EP 04031043.5. With this method of using orthogonal polynomial expansions on the disk (in the following: OPED algorithm), an image function representing the region of investigation is determined from Radon data as a sum of polynomials multiplied with values of projection functions measured corresponding to a plurality of predetermined projection directions through the region of investigation.

The image function obtained with the OPED reconstruction methods is a continuous function. As typical devices for image visualization have a digitized output, the continuous function is subjected to a discretization for presenting a visualized image. As an example, displaying the image function on a computer display or printing the image function with a digital data printer requires a discretization of the image function according to the screen resolution of the display or printer. As an example, the continuous image function is discretized with a pattern of 512*512 or 1024*1024 pixels. One value of the image function converted into a gray value is assigned to each of the pixels, respectively.

The conventional imaging techniques have a common disadvantage, which is associated with the discretization of the continuous image function. Usually, the local resolution of the visualized image is essentially smaller compared to a space frequency of local image function features. The pixel size of the visualized image is essentially larger compared to the size of local image function features. As the conventional discretization comprises a convolution of the image function with a Dirac function (delta function, unit impulse function) at each pixel, local features of the continuous image function can introduce distortions into the visualized image. As a result, artifacts can occur in the image in particular if local features of the image function have a characteristic period of high-frequency components of the image function being comparable with the pattern of discretization.

The above disadvantage is associated not only with the conventional CT imaging, but also with all available OPED reconstruction and image processing methods based on the collection of Radon data, like e. g. neutron transmission imaging, ultrasound tomography etc.

OBJECTIVE OF THE INVENTION

The objective of the invention is to provide improved methods of processing image functions based on Radon data avoiding the disadvantages of conventional image processing techniques. A further aspect of the objective of the invention is to provide an improved imaging method avoiding the disadvantages of the conventional imaging methods based on the collection of Radon data. Another objective of the invention is to provide improved devices adapted for imaging a region of investigation by reconstructing and processing measured Radon data.

The above objectives are achieved with methods or devices comprising the features of the independent claims. Advantageous embodiments and applications of the invention are defined in the dependent claims.

SUMMARY OF THE INVENTION

According to a first general aspect of the invention, an image processing method for providing a digitized approximation of an image function includes the step of calculating pixel values being determined from at least two image function values within a pixel size of the respective pixel.

As an essential advantage, improved pixel values are obtained, wherein influences due to the stochastic occurrence of local features of the image function at the sampling position with the conventionally used Dirac function are suppressed or even completely avoided. The pixel values are determined by at least two local features of the image function within the respective pixel size. The inventors have found that pseudo-information caused by single sampling with the Dirac function can be reduced even with the consideration of two image function values within the pixel size. Considering at least two image function values yields an additional integration within the pixel size, which allows to avoid artefacts in the image.

According to the invention, a continuously defined image function is digitized. The term "continuous image function" includes both analytical representations of the image function or quasi-continuous image functions. A quasi-continuous image function is represented by a discretized data set of image function values each of which representing a local region (or: area) being essentially smaller compared with the pixel size of the digitized representation of the image function to be obtained. As an example, the local region is smaller by a factor of at least 2, preferably at least 10, e. g. 100, compared with a digitized image pixel size. A corresponding number of image function values represent the course of the image function within each digitized image pixel.

According to a second general aspect of the invention, an imaging method for imaging a region of investigation of an object is proposed, which imaging method includes the steps of measuring Radon data with an imaging device, reconstructing an image function derived from the Radon data, and subjecting the image function to an image processing method according to the above first aspect of the invention. An essential advantage of the imaging method of the invention is given by the fact that the improved discretization of the image function is combined with the primary image data collection.

According to a third general aspect of the invention, an imaging device arranged for imaging a region of investigation of an object comprises a measuring device adapted for measuring projection functions, a reconstruction circuit adapted for reconstructing an image function derived from the measured projection functions, and an image processing circuit adapted for processing the image function with a method according to the above first aspect.

According to a preferred embodiment of the image processing method of the invention, the pixel values are determined by more than two image function values, e. g. at least 4, in particular more than 9 image function values within the pixel size. Accordingly, the integration of local image function features within each pixel can be further improved. According to a particularly preferred embodiment, the number of image function values considered within the pixel size is further increased so that the pixel values can be determined by evaluating an approximation of the image function resulting of a convolution of the image function with a predetermined filter function within the pixel size of the respective pixel. Advantageously, the filter function results in an integration over all local image function features, so that the deletion of artefacts can be improved. As an example, the filter function comprises a step function covering the whole pixel size of the respective pixel. Accordingly, all image function values within the pixel size contribute to the pixel value assigned to the respective pixel.

The image function processed according to the invention can be reconstructed from Radon data on the basis of any conventional reconstruction method resulting in a continuous image function. Particular advantages are obtained if the image function has been determined with the OPED algorithm noted above. While the OPED algorithm results in continuous image functions with detailed local features, the inventive discretization of the image function results in particular strong improvements of the image quality and suppression of image errors. Accordingly, the image function digitized according to the invention is preferably provided as a sum of polynomials multiplied with values of the Radon data projection functions. Correspondingly, the reconstruction circuit of the imaging device of the invention is preferably adapted for reconstructing the image function as a sum of polynomials multiplied with values of the measured protection functions.

As the discretization of the image function requires additional processing time, the complete time necessary for presenting a digitized image of a region under investigation may be increased. Advantageously, this increase of processing time can be compensated if a Fast Fourier transform procedure (FFT procedure) is implemented into the reconstruction of the image function as follows.

The projection functions measured with the imaging device of the invention comprise discrete projection profiles, each discrete projection profile comprising projection values $\gamma(v,j)$ corresponding to a plurality of projection lines (j) with the same projection direction (v). The image function $f$ can be represented as a projection sum $$A_{2m}(f; x, y) = \sum_{v=0}^{2m} \sum_{k=0}^{2m} S_{k,v} U_k(x\cos\phi_v + y\sin\phi_v)$$

$$\left(\text{with } S_{k,v} = \frac{k+1}{(2m+1)^2} \sum_{j=0}^{2m} \gamma_{j,v} \sin(k+1)\frac{(2\gamma+1)\pi}{4m+2},\right.$$

$$\left.\phi_v = \frac{2v\pi}{2m+1} \text{ and } U_k \text{ being Chebyshev polynomials}\right)$$

as outlined in EP 04031043.5.

According to the preferred embodiment of the invention (so-called FAST-OPED algorithm), the image function $f$ is determined by the steps of determining an intermediate sum $$\sum_{k=0}^{2m} S_{k,v} \sin(k+1)\theta_v \text{ (with } \theta_v = \arccos(x\cos\phi_v + y\sin\phi_v))$$

with a Sinus Transform procedure, and determining the projection sum as $$A_{2m}(f; x, y) = \sum_{v=0}^{2m} \frac{1}{\sin\theta_v(x, y)} \sum_{k=0}^{2m} S_{k,v} \sin(k+1)\theta_v.$$

With the application of the Sinus Transform procedure, the image function reconstruction is essentially accelerated. In the best case, the inventive reconstruction needs only $2m\log_2 2m$ operations instead of $(2m)^2$ operations. Typically, the processing time e. g. for m=512 can be reduced with this embodiment by a factor of 100. Furthermore, the hardware circuit provided for calculating the protection sum has an improved design.

Preferably, the intermediate sum is determined with $$\theta_l(x, y) = \frac{(l+1)\pi}{2m+2}, \quad l = 0, 1, \ldots, 2m-1.$$

In particular, the intermediate sum can be determined with $\theta_l(x,y)$ obtained by an interpolation procedure between subsequent values of the sum in values $$\frac{(l+1)\pi}{2m+2}, \quad l = 0, 1, \ldots, 2m-1.$$

Preferably, the above implementation of the Sinus Transform procedure, the determination of the image function comprises the step of determining $$S_{k,v} = \frac{k+1}{(2m+1)^2} \sum_{j=0}^{2m} \gamma_{j,v} \sin(k+1)\varphi_j$$

with a Fast Fourier Transform procedure.

The FAST-OPED algorithm has been proved to converge uniformly on any compact subset in the disk and the numerical test has shown that it reconstructs images accurately and as good as the conventional OPED algorithm. The FAST OPED algorithm with the interpolation step is not only much faster, it also shares main merits of the conventional OPED algorithm.

The implementation of the FAST-OPED algorithm is not restricted to the combination with the image processing method according to the above first aspect of the invention. In fact, the FAST-OPED algorithm can be generally used for reconstructing Radon-based data obtained as described e. g. in EP 040 310 43.5. Accordingly the FAST-OPED algorithm represents a further independent aspect of the invention.

The imaging method of the invention preferably comprises the steps of arranging an object in the measuring device of the imaging device, subjecting the object to an energy input directed along the plurality of predetermined projection directions, and measuring the projection profiles. At least one of the object and the measuring device can be translated in a predetermined direction during the step of subjecting the object to the energy input for obtaining helical projection data.

Preferably, the digitized image of the image function is displayed as a visualized image to be obtained. Generally, the term "displaying" refers to any type of visualized presentation, like e. g. presenting on a image display device or in printed form.

Generally, the invention can be used for generating images from Radon data or Radon-like data. It is an essential advantage of the invention, that this image generation can be used in various applications like many applications in medical imaging, for example CT, PET, SPECT, gamma-camera imaging etc. However, there are a lot more possible applications like ultrasound tomographic imaging, light tomography, any multidimensional imaging for industrial testing or biological research and so on. Preferably, the image function is determined from Radon data measured in an X-ray computer tomography (CT) device, an ultrasound tomography device, a PET imaging device, a light tomography device, a Gamma-ray imaging device, a SPECT imaging device, a neutron based transmission detection system, or an electrical impedance tomography device. Accordingly, the object under investigation preferably comprises a biological organism or a part thereof, a fluid composition, a solid material, a workpiece, and/or an object to be investigated for security reasons.

Further subjects of the invention are a digital storage medium or a computer program product with electronically readable data comprising a sum of polynomials, said data being able to interact with an imaging device arranged implementing a method according to the invention, a computer program residing on a computer-readable medium, with a program code for carrying out the method of the invention, and an apparatus comprising a computer-readable storage medium containing program instructions for carrying out the method of the invention.

BRIEF DESCRIPTION OF THE DRAWINGS

Further details and advantages of the invention are described in the following with reference to the attached drawings, which show in.

EMBODIMENTS OF THE INVENTION

The invention is described in the following with reference to the preferred application in the field of X-ray based computer tomography. It is emphasized that the invention can be implemented in an analogous way with the application of other types of energy input beams (like e.g. neutrons or light, e.g. in the VIS or IR range) and/or other types of projection-based imaging (like e.g. projection radiography). Furthermore, the following description of the preferred embodiments mainly refers to the image function discretization. Details of the CT devices used for implementing the invention are not described as long as they are known from conventional CT devices. Details and terms of the OPED algorithm are described in EP 040 310 43.5, which is incorporated into the present specification by reference.

1. Determining Discretized Pixel Values

Figure 1:
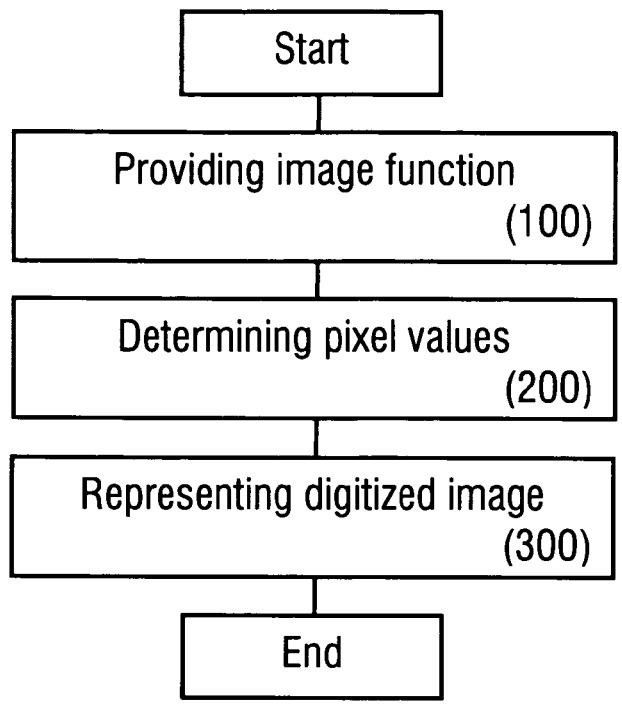
FIG. 1 a flow chart illustrating an embodiment of the image function processing method according to the invention.
Figure 2:
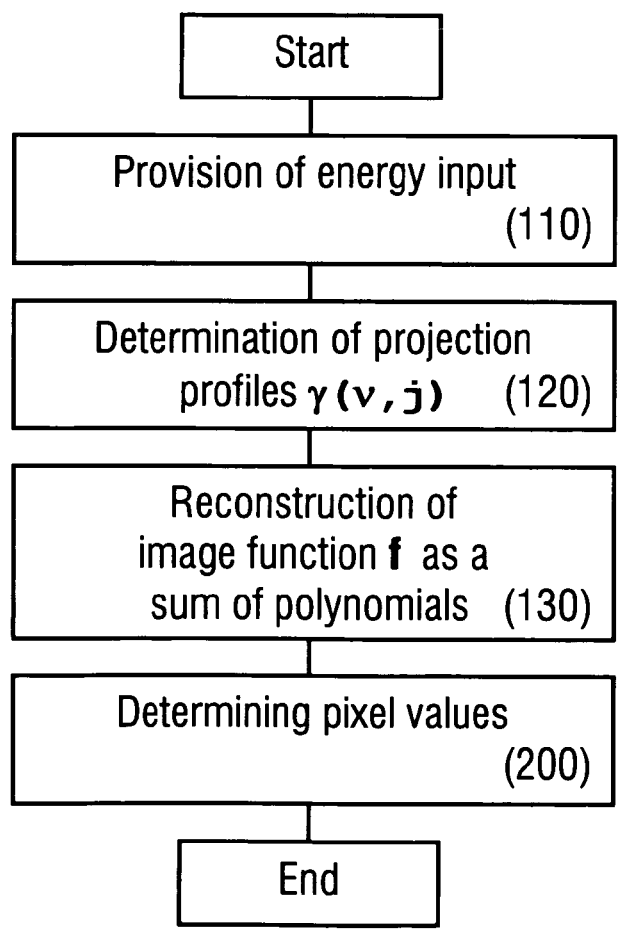
FIG. 2 a flow chart illustrating an embodiment of the imaging method according to the invention.

According to FIG. 1, the basic steps of an image function processing method according to the invention comprise step 100 of providing an image function, step 200 of determining discretized pixel values and (optionally) step 300 of representing a digitized image on the basis of the discretized pixel values. FIG. 2 illustrates steps of an embodiment of the imaging method according to the invention. Step 100 can be implemented in dependence on the particular application of the image function processing method. As an example, step 100 can comprise in particular sub-steps 110, 120 and 130 as illustrated in FIG. 2. These sub-steps schematically represent the measurement and OPED-based reconstruction of Radon data as described in EP 040 310 43.5. Alternatively, step 100 can comprise a provision of the image function as an analytical expression or as a quasi-continuous data set. Step 300 is not a necessary feature of the invention. Instead of a digitized image representation, the pixel values determined with step 200 can be stored in a data storage of e.g. an imaging device or another image processor.

In particular, sub-steps 110, 120 and 130 include directing a plurality of X-ray beams at predetermined projection directions through a region of investigation, determining projection profiles comprising attenuation values measured with the plurality of X-ray beams, and reconstructing an image function $f$ derived from the projection profiles.

Figure 3:
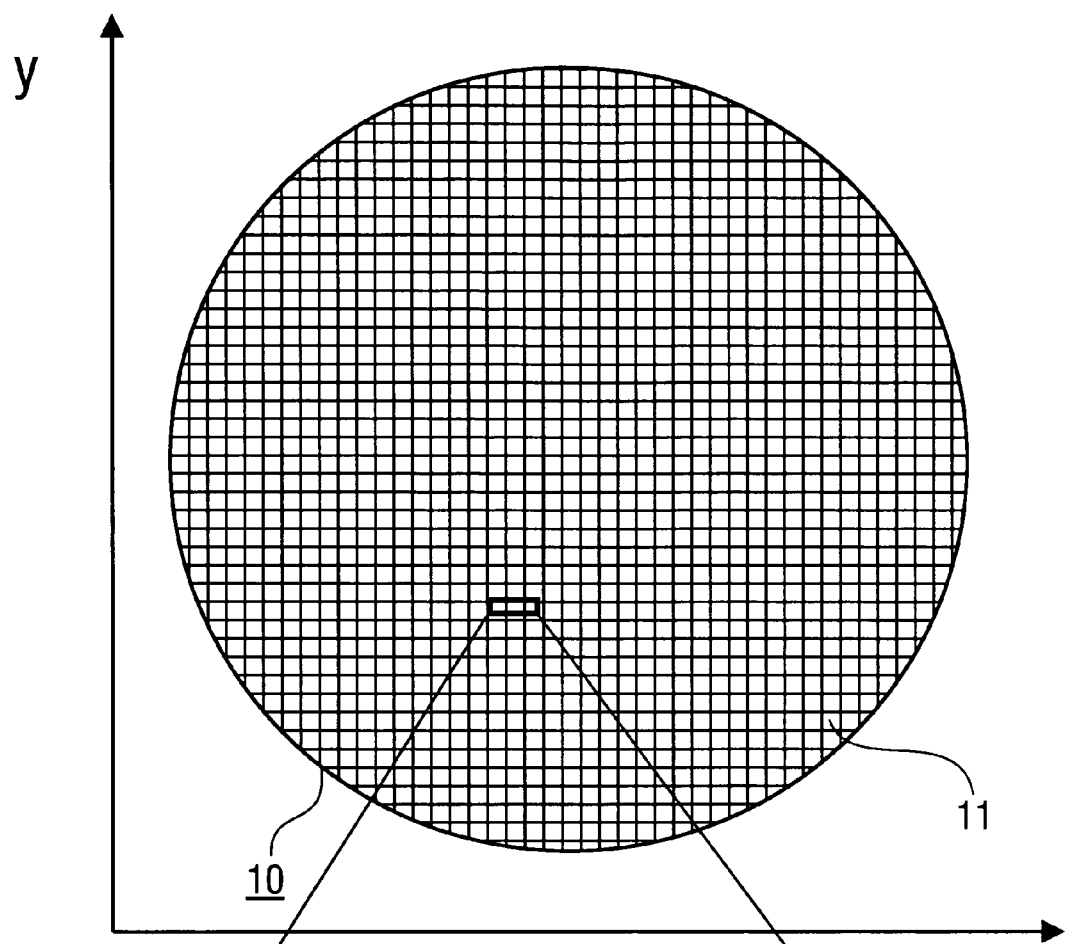
FIGS. 3 and 4: schematic illustrations of determining pixel values according to the invention.
Figure 4:
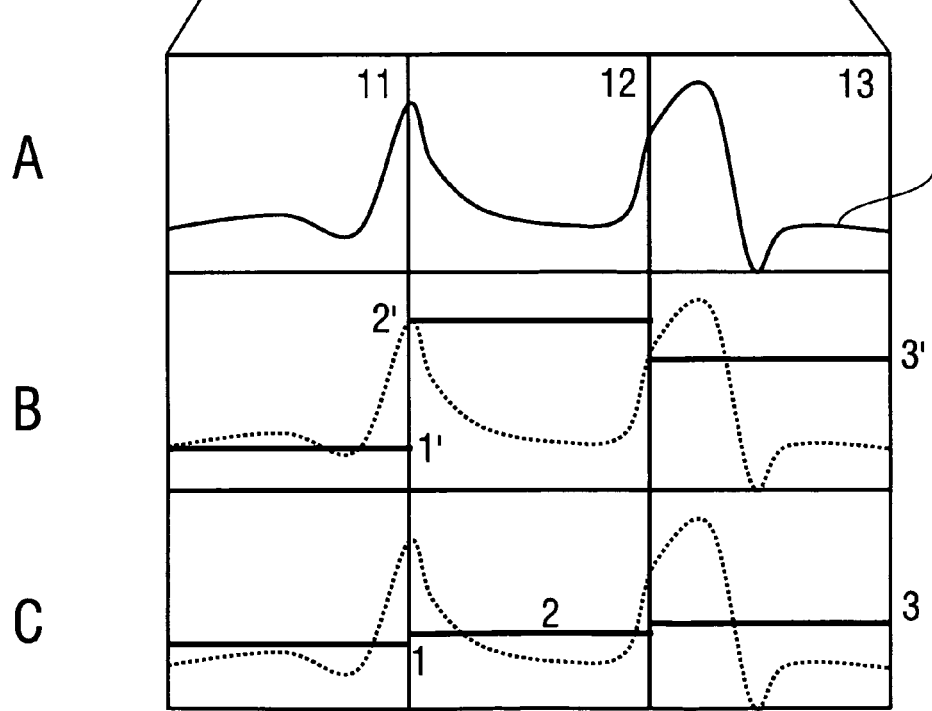

Further details of step 200 are described with reference to the schematic illustration in FIGS. 3 and 4. FIG. 3 illustrates a pixel array 10 including a plurality of pixels 11 being arranged for representing an image function $f$. FIG. 4A represents an enlarged view of three particular pixels 11, 12 and 13 with an exemplary image function $f$.

Typically, a particular approach for selecting a suitable number of pixels in pixel array 10 is determined by the measurement conditions of the imaging device used for providing the image function. As an example, if the imaging device comprises a CT device adapted for collecting Radon data of a region of investigation of 30 cm and the detector device has a resolution of 0.5 mm, about 600·600 pixels 11 can be used for representing a digitized image of the region of investigation. Pixel array 10 comprises e.g. pixels of a display device, like a LED display with a typical pixel size of about 200 μm, or a pixel distribution, which can be printed with a digital printer having a pixel size of e.g. 80 μm.

According to the conventional techniques, pixel values 1', 2' and 3' (FIG. 4B) are obtained by a convolution of the image function $f$ with the Dirac function located e.g. at a left border of each pixel. As a result, the pixel values 1', 2' and 3' are identical with the image function values at the pixel borders. This result has a stochastic character as the pixel values are determined by local feature of the image function only. The conventional technique is replaced by a determination of the pixel values in dependence on at least two image function values within the size of each pixel as shown in FIG. 4C.

According to FIG. 4C, the pixel values 1, 2 and 3 are determined by a convolution of the image function $f$ with a filter function comprising e.g. a step function within the pixel size of the respective pixel. As the result, pixel values 1, 2 and 3 represent an improved averaged approximation of the image function values within each pixel 11, 12 or 13. Calculation of digitized pixel values is obtained in two or more image dimensions in an analogue manner.

2. Accelerated Image Function Reconstruction (FAST-OPED)

2.1 Mathematical Background

The additional integration of the image function in each pixel requires additional processing time. The additional processing time is preferably compensated according to the invention by a reconstruction of the image function with a modified OPED algorithm (so-called FAST-OPED), which is described in the following.

According to the OPED algorithm described in EP 040 310 43.5, an approximation of the image function can be directly calculated as a double sum $A_{2m}$ from measured projection values.

$$A_{2m}(f, x, y) = \sum_{v=0}^{2m} \sum_{j=0}^{2m} g_{j,v} T_{j,v}(x, y) \quad (1)$$

$$g_{j,v} =: Rf(\phi_v, \cos\psi_j)$$

with $$\phi_v = \frac{2v\pi}{2m+1}, \quad \psi_v = \frac{(2j+1)\pi}{4m+2}$$

and $$T_{j,v}(x, y) = \frac{1}{(2m+1)^2} \sum_{k=0}^{2m} (k+1)\sin(k+1)\psi_j U_k(x\cos\phi_v + y\sin\phi_v)$$

and $$U_k(t) = \frac{\sin(k+1)\theta}{\sin\theta}, \quad t = \cos\theta \quad (2)$$

($U_k$ denote the Chebyshev polynomials of the second kind)

The structure of the $A_{2m}$ is used to implement Fast Fourier Transformation (FFT) once in a straightforward manner. With the definition $$S_{k,v} = \frac{k+1}{(2m+1)^2} \sum_{j=0}^{2m} g_{j,v} \sin(k+1)\psi_j. \quad (3)$$

the values of $S_{k,v}$ can be evaluated by FFT for discrete sine transform. Accordingly, term $A_{2m}$ can be written as $$A_{OPED} = \sum_{v=0}^{2m} \sum_{k=0}^{2m} S_{k,v} U_k(x\cos\phi_v + y\sin\phi_v) \quad (4)$$

Thus, the main step of the OPED algorithm lies in the evaluation of the above double sum, which can be considered as a back projection step. Let $N=2m+1$. Then the evaluation of the matrix $S_{k,v}$ costs 'O($N^2\log N$) operations (flops). The evaluation of the double sum costs 'O($N^2$)' operations. Hence, the cost of evaluation on a grid of M×M is 'O($N^2(M^2+\log N)$)'. In particular, if M~N, then the cost is 'O($N^4$)'. The main operation cost is at the evaluation of the double sums at the grid points. In other words, the main cost lies in the back projection step.

Unlike the Filtered Back Projection algorithm, the sum in (4) does not contain a discrete convolution that can be evaluated via FFT. However, the formula of $U_k$, in (2) allows to write $$A_{OPED}(x, y) = \sum_{v=0}^{2m} \frac{1}{\sin\theta_v} \sum_{k=0}^{2m} S_{k,v} \sin(k+1)\theta_v \quad (5)$$

where $\theta_v := \theta_v(x,y) = \arccos(x\cos\phi_v + y\sin\phi_v)$

Figure 5:
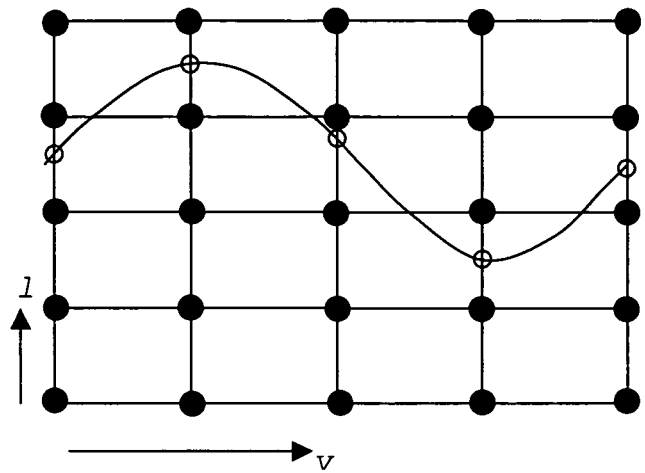
FIG. 5 a schematic illustration of an interpolation step included in the image reconstruction algorithm used according to the invention.

The inner sum can be evaluated by FFT for discrete sine transform at certain points, which suggests that an interpolation step is introduced to take advantage of the fast evaluation by FFT. With further detail, it is defined $$\alpha_v(\theta) = \sum_{v=0}^{2m} S_{k,v} \sin(k+1)\theta, \quad 0 \leq \theta \leq \pi \quad (6)$$

after the inner sum of (5). In FIG. 5, the black points illustrate $\theta_v$ and the hollow points mean $\theta$ (x,y).

The FFT for discrete sine transforms can be used to evaluate the numbers $$\alpha_{l,v} := \alpha_v(\xi_l), \quad \xi_l := \frac{(l+1)\pi}{2m+1}, \quad l = 0, 1, \ldots, 2m-1$$

effectively. That is, the inner sum in (5) can be evaluated by FFT when $\theta_v(x,y) = \xi_l$.

For the interpolation step, a linear interpolation is preferably used. For a given (x,y), the integer l is chosen such that $\theta_v(x,y)$ lies between and $\xi_l$ and $\xi_{l+1}$ and the value of the linear interpolation between $\alpha_{l,v}$ and $\alpha_{l+1,v}$ is used as an approximation to the inner sum of (5). The linear interpolation is given by $$l_v(\theta) = u_v(\theta)\alpha_{l+1,v} + (1 - u_v(\theta))\alpha_{l,v}, \quad u_v(\theta) := \frac{\theta - \xi_l}{\xi_{l+1} - \xi_l},$$

where $\xi_l \leq \theta \leq \xi_{l+1}$. Then the fast implementation of OPED algorithm (step 130 in FIG. 2) comprises the following steps.

Step 1. For each v=0, ... 2m, FFT is used to compute for each k=0, ... 2m, (m: positive integer)

$$S_{k,v} = \frac{k+1}{(2m+1)^2} \sum_{j=0}^{2m} g_{j,v} \sin(k+1)\psi j.$$

Step 2. For each L=0, 1, ... 2m−1, FFT is used to compute $$\alpha_{l,v} = \sum_{k=0}^{2m} S_{k,v} \sin(k+1)\xi$$

Step 3. For each reconstruction point (x,y) inside a region of investigation (disk of the radius $$\cos\left(\frac{\pi}{2m+1}\right)$$

integers l are determined such that $$1 = \left\lfloor \frac{2m+1}{\pi} \theta_v \right\rfloor - 1,$$

where $\theta_v = \arccos(x\cos\phi_v + \sin\phi_\mu)$

Finally, the image function $f$ is calculated according to $$f_{OPED} = \sum_{v=0}^{2m} \frac{1}{\sin\theta_v} [(1-u_v)\alpha_{l,v} + u_v \alpha_{l+1,v}], \quad (7)$$

where $u_v = (2m+1)\theta_v/\pi - (l+1)$.

It is noted that $\sin\theta_v$ appears in the denominator in the last step of the algorithm. However, $\sin\theta_v = 0$ only if $\cos\theta_v(x,y) = x\cos\phi_v + y\sin\phi_v = 1$, which happens only if $(x,y) = (\cos\phi_v, \sin\phi_v)$. Since the points $(\cos\phi_v, \sin\phi_v)$ are on the boundary of the region B, they do not have to be taken as reconstruction points. In fact, the region of investigation is usually inside the unit disk; thus, the calculation can be restricted to points inside a smaller disk in B, and this will also ensure that the values of $\sin\theta_v$ in the last step will not be too small to cause loss of significant digits in the computation. Furthermore, if (x,y) is restricted to a disk with radius $\cos\xi_0 = \cos\pi/(2m+1)$, then it will also guarantee that the choice of l in the step 3 is unique for all (x,y) in that disk.

The algorithm uses FFT twice, the final sum in step 3 is a single sum whose evaluation costs 'O(N) operations. Hence, the cost of evaluations on an M×M grid with M~N is 'O(N³), which is in the same order of magnitude as the FBP algorithm.

2.2 Implementation and Result

For numerical implementation, FFT for discrete sine transform in the package FFTW (http://www.fftw.org/) has been used. The numerical example is conducted on a so-called Shepp-Logan head phantom. This is an analytic phantom, highly singular, as the image contains jumps at the boundary of every ellipse in the image, include the one on the boundary. The function that represents the image is a step function, which is not continuous at the boundary of the ellipses.

Reconstructing the image has been conducted with OPED algorithm without the interpolation step and Fast OPED algorithm, which contains the interpolation step as shown above, respectively. In both cases, $S_{k,v}$ has been computed with FFT.

The reconstruction was carried out on a CELSIUS R610 computer with two Intel Xenon(TM) CPU, each 3065 MHz, and 4 GB RAM (code is written in C language). Using OPED algorithm, the reconstruction took 344 seconds, in which more than 95% of the time is used on the back projection step. Using Fast OPED algorithm, the reconstruction took merely 13 seconds, an improvement of more that 26 times. Furthermore, the two images show almost no visual difference.

Evaluating the errors of the reconstruction has shown that FAST OPED is slightly worse in relative least square error, but slightly better in mean error. The order of magnitude of the error is the same. The difference is practically negligible.

3. Imaging Device

Figure 6:
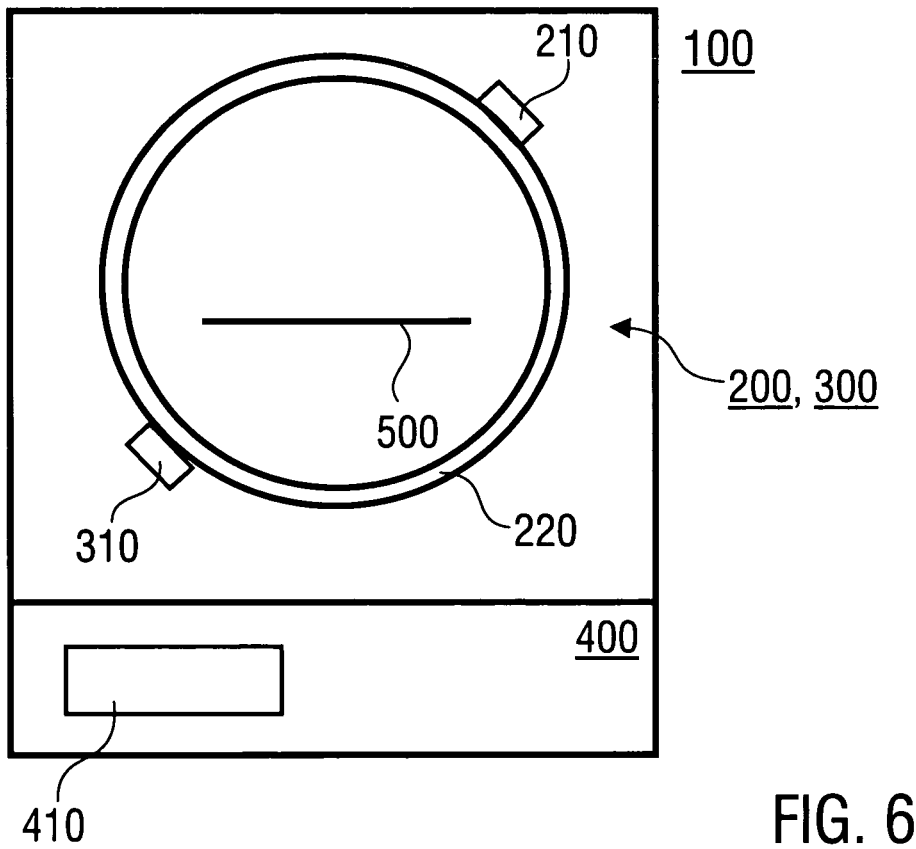
FIG. 6 a schematic illustration of an embodiment of an imaging device according to the invention.

FIG. 6 schematically illustrates an embodiment of the imaging device 100. The imaging device 100 includes the measuring device with an energy generator 200 and the detector device 300, and an reconstruction circuit 400 being connected with the measuring device. Furthermore, a holding device 500 is provided, which is e.g. a carrier table as it is known from CT systems or any other carrier or substrate holder for arranging an object under investigation in the measuring device and for adjusting the geometry of the object relative to the energy generator 200 and the detector device 300. Further components like a control device, a display device etc. (not shown) are provided for as they are known per se from prior art devices.

The energy generator 200 comprises an energy input source 210, like e.g. a movable X-ray arranged on a source carrier 220 (e.g. a guide rail) as it is known from conventional CT devices. The detector device comprises a sensor array 310 which is movably arranged on the source carrier 220 in opposite relationship relative to the energy input source 210. With this structure, the projection direction through the ROI (parallel to the plane of drawing) can be set by rotating the combination of components 210, 310 around the holding device 500. The source carrier 220 is illustrated as a circle allowing a rotation of the energy generator 200 and the detector device 300 around an object. According to a modification, the source carrier can have an ellipse shape or another shape. This can represent an advantage in terms of an adaptation to the geometry of the object to be investigated.

The reconstruction circuit 400 being connected with the measuring device 200, 300 is adapted for reconstructing an image function $f$ as a sum of polynomials multiplied with values of the measured projection functions. The reconstruction circuit 400 includes an image processing circuit 410 adapted for discretizing the image function $f$ with the image processing method according to the above first aspect of the invention. The image processing circuit 410 is implemented e.g. with a microprocessor comprising a computer-readable storage medium containing program instructions for carrying out the inventive.

The features of the invention disclosed in the above description, the drawings and the claims can be of significance both individually as well as in combination for the realization of the invention it its various embodiments.

The invention claimed is:

1. An image processing method for providing a digitized image as an approximation of an image function $f$, wherein the digitized image comprises a plurality of pixels with a predetermined pixel size, comprising the steps of:
   providing the image function $f$ from Radon data comprising a plurality of projection functions measured corresponding to a plurality of predetermined projection directions (v), wherein the projection functions comprise discrete projection profiles, each discrete projection profile comprising projection values γ (v, j) corresponding to a plurality of projection lines (j) with the same projection direction (v), wherein j and v are non-negative integers, wherein the image function $f$ can be represented as a projection sum $$A_{2m}(f; x, y) = \sum_{v=0}^{2m} \sum_{k=0}^{2m} S_{k,v} U_k(x\cos\phi_v + y\sin\phi_v),$$

wherein x and y are spatial coordinates and k and m are non-negative integers, $$S_{k,v} = \frac{k+1}{(2m+1)^2} \sum_{j=0}^{2m} \gamma_{j,v} \sin(k+1) \frac{(2\gamma+1)\pi}{4m+2}, \phi_v = \frac{2v\pi}{2m+1} \text{ and } U_k$$

are orthogonal ridge polynomials, and the image function $f$ is determined in an image reconstruction processor by the steps of:
determining an intermediate sum $$\sum_{k=0}^{2m} S_{k,v} \sin(k+1)\theta_v,$$

wherein
$\theta_v$=arccos(x cos $\phi_v$ +y sin $\phi_v$)) with a Sinus Transform procedure, and
determining the projection sum as $$A_{2m}(f; x, y) = \sum_{v=0}^{2m} \frac{1}{\sin\theta_v(x,y)} \sum_{k=0}^{2m} S_{k,v} \sin(k+1)\theta_v,$$

and
determining pixel values from the image function, the pixel values representing the digitized image to be obtained, wherein the pixel values are determined in dependence on at least two image function values within the pixel size of the respective pixel.

2. The method of claim 1, wherein the pixel values are determined by a convolution of the image function with a filter function within the pixel size of the respective pixel.

3. The method of claim 2, wherein the pixel values are determined by a convolution of the image function with a step function within the pixel size of the respective pixel.

4. The method of claim 1, wherein the pixel values are determined as average values of the image function within the pixel size of the respective pixel.

5. The method of claim 1, wherein the image function $f$ is provided as a sum of polynomials multiplied with values of the projection functions.

6. The method of claim 1, wherein the intermediate sum is determined with $$\theta_l(x,y) = \frac{(l+1)\pi}{2m+2}, \quad l = 0, 1, \ldots, 2m-1.$$

7. The method of claim 1, wherein the intermediate sum is determined with $\theta_l(x,y)$ obtained by an interpolation procedure between subsequent values $$\frac{(l+1)\pi}{2m+2} \quad l = 0, 1, \ldots, 2m-1.$$

8. The method of claim 7, wherein the intermediate sum is determined with $\theta_v(x,y)$ obtained by a linear interpolation procedure.

9. The method of claim 1, comprising the step of determining $$S_{k,v} = \frac{k+1}{(2m+1)^2} \sum_{j=0}^{2m} \gamma_{j,v} \sin(k+1)\varphi_j$$

with a Fast Fourier Transform procedure.

10. The method of claim 1, wherein the image function $f$ is determined from Radon data measured in:
an X-ray computer tomography (CT) device,
an ultrasound tomography device,
a PET imaging device,
light tomography,
a Gamma-ray imaging device,
a SPECT imaging device,
a neutron based transmission detection system, or
an electrical impedance tomography device.

11. An imaging method for imaging a region of investigation in an object, comprising the steps of:
directing a plurality of energy input beams at predetermined projection directions (v) through the region of investigation,
determining projection profiles comprising attenuation values measured with the plurality of energy input beams, and
reconstructing an image function $f$ derived from the projection profiles in an image reconstruction processor, wherein the image function $f$ is based on Radon data associated with a plurality of projection functions measured corresponding to a plurality of predetermined projection directions (v), wherein the projection functions comprise discrete projection profiles, each discrete projection profile comprising projection values γ(v, j) corresponding to a plurality of projection lines (j) with the same projection direction (v), wherein j and v are non-negative integers, the image function $f$ can be represented as a projection sum $$A_{2m}(f; x, y) = \sum_{v=0}^{2m} \sum_{k=0}^{2m} S_{k,v} U_k(x\cos\phi_v + y\sin\phi_v),$$

and x and y are spatial coordinates and k and m are non-negative integers, and $$S_{k,v} = \frac{k+1}{(2m+1)^2} \sum_{j=0}^{2m} \gamma_{j,v} \sin(k+1) \frac{(2\gamma+1)\pi}{4m+2}, \phi_v = \frac{2v\pi}{2m+1} \text{ and } U_k$$

are orthogonal ridge polynomials, and subjecting the image function $f$ to an image processing method comprising:

determining an intermediate sum $$\sum_{k=0}^{2m} S_{k,v}\sin(k+1)\theta_v$$

with a Sinus Transform procedure wherein $\theta_v = \arccos(x \cos \phi_v + y \sin \phi_v)$, x and y are spatial coordinates, and k and m are non-negative integers, determining a projection sum as $$A_{2m}(f;x,y) = \sum_{v=0}^{2m} \frac{1}{\sin\theta_v(x,y)} \sum_{k=0}^{2m} S_{k,v}\sin(k+1)\theta_v,$$

and determining pixel values from the image function $f$, the pixel values representing the digitized image to be obtained, wherein the pixel values are determined in dependence on at least two image function values within the pixel size of the respective pixel.

12. The imaging method of claim 11, further comprising the step of:

displaying the digitized image of the image function $f$ a visualized image to be obtained.

13. The imaging method of claim 11, wherein the process of determining the projection profiles comprises the steps of:

arranging an object in a measuring device, subjecting the object to an energy input directed along the plurality of predetermined projection directions (v), and measuring the projection profiles.

14. The imaging method of claim 13, wherein at least one of the object and the measuring device is translated in a predetermined direction during the step of subjecting the object to the energy input for obtaining helical projection data.

15. The imaging method of claim 11, wherein the object comprises at least one of:

a biological organism or a part thereof,
a fluid composition,
a solid material,
a work-piece, and
an object to be investigated for security reasons.

16. An imaging device for imaging a region of investigation in an object, the imaging device comprising:

a measuring device adapted for measuring projection functions corresponding to a plurality of predetermined projection directions (v), a reconstruction circuit adapted for reconstructing an image function $f$ on the basis of the measured projection functions, the reconstruction circuit being connected with the measuring device, and an image processing circuit adapted for processing the image function $f$ according to a method comprising:

providing the image function $f$ from Radon data comprising a plurality of projection functions measured corresponding to a plurality of predetermined projection directions (v), wherein the projection functions comprise discrete projection profiles, each discrete projection profile comprising projection values $\gamma$ (v, j) corresponding to a plurality of projection lines (j) with the same projection direction (v), wherein and v are non-negative integers and the image function $f$ can be represented as a projection sum $$A_{2m}(f;x,y) = \sum_{v=0}^{2m} \sum_{k=0}^{2m} S_{k,v} U_k(x\cos\phi_v + y\sin\phi_v),$$

wherein x and y are spatial coordinates and k and m are non-negative integers, and $$S_{k,v} \frac{k+1}{(2m+1)^2} \sum_{j=0}^{2m} \gamma_{j,v} \sin(k+1)\frac{(2\gamma+1)\pi}{4m+2}, \phi_v = \frac{2v\pi}{2m+1} \text{ and } U_k$$

are orthogonal ridge polynomials, and the image function $f$ is determined by the steps of:

determining an intermediate sum $$\sum_{k=0}^{2m} S_{k,v}\sin(k+1)\theta_v,$$

wherein $\theta_v = \arccos(x \cos \phi_v + y \sin \phi_v)$ with a Sinus Transform procedure, and determining the projection sum as $$A_{2m}(f;x,y) = \sum_{v=0}^{2m} \frac{1}{\sin\theta_v(x,y)} \sum_{k=0}^{2m} S_{k,v}\sin(k+1)\theta_v,$$

and determining pixel values from the image function, the pixel values representing the digitized image to be obtained, wherein the pixel values are determined in dependence on at least two image function values within the pixel size of the respective pixel.

17. The imaging device of claim 16, wherein the reconstruction circuit is adapted for reconstructing the image function $f$ as a sum of polynomials multiplied with values of the measured projection functions.

18. A non-transitory digital storage media or computer program product with electronically readable data comprising a sum of polynomials, said data being able to interact with a calculation unit in an imaging device for conducting a method comprising: providing a digitized image as an approximation of an image function $f$, wherein the digitized image comprises a plurality of pixels with a predetermined pixel size, providing the image function $f$ from Radon data comprising a plurality of projection functions measured corresponding to a plurality of predetermined projection directions (v), wherein the projection functions comprise discrete projection profiles, each discrete projection profile comprising projection values $\gamma$ (v,j) corresponding to a plurality of projection lines (j) with the same projection direction (v), wherein j and v are non-negative integers and the image function $f$ can be represented as a projection sum $$A_{2m}(f;x,y) = \sum_{v=0}^{2m}\sum_{k=0}^{2m} S_{k,v} U_k(x\cos\phi_v + y\sin\phi_v),$$

wherein x and y are spatial coordinates and k and m are non-negative integers, and $$S_{k,v}\frac{k+1}{(2m+1)^2}\sum_{j=0}^{2m}\gamma_{j,v}\sin(k+1)\frac{(2\gamma+1)\pi}{4m+2}, \phi_v = \frac{2v\pi}{2m+1} \text{ and } U_k$$

are orthogonal ridge polynomials, and the image function $f$ is determined by the steps of:

determining an intermediate sum $$\sum_{k=0}^{2m} S_{k,v}\sin(k+1)\theta_v,$$

wherein $\theta_v$=arccos(x cos $\phi_v$+y sin $\phi_v$)) with a Sinus Transform procedure, and determining the projection sum as $$A_{2m}(f;x,y) = \sum_{v=0}^{2m}\frac{1}{\sin\theta_v(x,y)}\sum_{k=0}^{2m}S_{k,v}\sin(k+1)\theta_v,$$

and determining pixel values from the image function, the pixel values representing the digitized image to be obtained, wherein the pixel values are determined in dependence on at least two image function values within the pixel size of the respective pixel.

19. A non-transitory computer-readable media having computer executable instructions for carrying out a method comprising, providing a digitized image as an approximation of an image function $f$ wherein the digitized image comprises a plurality of pixels with a predetermined pixel size, providing the image function $f$ from Radon data comprising a plurality of projection functions measured corresponding to a plurality of predetermined projection directions (v), wherein the projection functions comprise discrete projection profiles, each discrete projection profile comprising projection values γ (v,j) corresponding to a plurality of projection lines (j) with the same projection direction (v), wherein j and v are non-negative integers and the image function $f$ can be represented as a projection sum $$A_{2m}(f;x,y) = \sum_{v=0}^{2m}\sum_{k=0}^{2m} S_{k,v} U_k(x\cos\phi_v + y\sin\phi_v),$$

wherein x and y are spatial coordinates and k and m are non-negative integers, and $$S_{k,v}\frac{k+1}{(2m+1)^2}\sum_{j=0}^{2m}\gamma_{j,v}\sin(k+1)\frac{(2\gamma+1)\pi}{4m+2}, \phi_v = \frac{2v\pi}{2m+1} \text{ and } U_k$$

re orthogonal ridge polynomials, and the image function $f$ is determined by the steps of:

determining an intermediate sum $$\sum_{k=0}^{2m} S_{k,v}\sin(k+1)\theta_v,$$

wherein $\phi_v$=arccos(x cos $\phi_v$+y sin $\phi_v$)) with a Sinus Transform procedure, and determining the projection sum as $$A_{2m}(f;x,y) = \sum_{v=0}^{2m}\frac{1}{\sin\theta_v(x,y)}\sum_{k=0}^{2m}S_{k,v}\sin(k+1)\theta_v,$$

and determining pixel values from the image function, the pixel values representing the digitized image to be obtained, wherein the pixel values are determined in dependence on at least two image function values within the pixel size of the respective pixel.

20. An apparatus comprising a non-transitory computer-readable storage medium containing program instructions for carrying out a method comprising:

providing a digitized image as an approximation of an image function $f$, wherein the digitized image comprises a plurality of pixels with a predetermined pixel size, providing the image function $f$ from Radon data comprising a plurality of projection functions measured corresponding to a plurality of predetermined projection directions (v), wherein the projection functions comprise discrete projection profiles, each discrete projection profile comprising projection values γ (v,j) corresponding to a plurality of projection lines (j) with the same projection direction (v), wherein j and v are non-negative integers and the image function $f$ can be represented as a projection sum $$A_{2m}(f;x,y) = \sum_{v=0}^{2m}\sum_{k=0}^{2m} S_{k,v} U_k(x\cos\phi_v + y\sin\phi_v),$$

wherein x and y are spatial coordinates and k and m are non-negative integers, and $$S_{k,v}\frac{k+1}{(2m+1)^2}\sum_{j=0}^{2m}\gamma_{j,v}\sin(k+1)\frac{(2\gamma+1)\pi}{4m+2}, \phi_v = \frac{2v\pi}{2m+1} \text{ and } U_k$$

are orthogonal ridge polynomials, and the image function $f$ is determined by the steps of:

determining an intermediate sum $$\sum_{k=0}^{2m} S_{k,v}\sin(k+1)\theta_v,$$

wherein $\phi_v = \arccos(x \cos \phi_v + y \sin \phi_v)$ with a Sinus Transform procedure, and
determining the projection sum as $$A_{2m}(f; x, y) = \sum_{v=0}^{2m} \frac{1}{\sin\theta_v(x, y)} \sum_{k=0}^{2m} S_{k,v}\sin(k+1)\theta_v,$$

and
determining pixel values from the image function, the pixel values representing the digitized image to be obtained, wherein the pixel values are determined in dependence on at least two image function values within the pixel size of the respective pixel.

* * * * *